United States Patent [19]
Tolf et al.

[11] 3,770,141
[45] Nov. 6, 1973

[54] APPARATUS FOR INVERTING STACKED UNITS OF SHEET MATERIAL

[75] Inventors: Ingvar L. Tolf; Vernon J. Herzing; Everett L. Miller, all of Battle Creek; George L. Lightfoot, Bellevue, all of Mich.

[73] Assignee: General Foods Corporation, White Plains, N.Y.

[22] Filed: Jan. 18, 1971

[21] Appl. No.: 107,495

Related U.S. Application Data
[62] Division of Ser. No. 795,187, Jan. 30, 1969, Pat. No. 3,580,402.

[52] U.S. Cl. ............................................. 214/1 Q
[51] Int. Cl. ............................................. B65g 7/00
[58] Field of Search ................................. 214/1 Q

[56] References Cited
UNITED STATES PATENTS

| | | | |
|---|---|---|---|
| 3,184,079 | 5/1965 | Buccicone | 214/1 Q |
| 3,547,279 | 12/1970 | Radomski | 214/1 Q |
| 2,984,364 | 5/1961 | Lamb | 214/1 Q |
| 3,071,258 | 1/1963 | Seigh et al. | 214/1 Q |
| 3,497,082 | 2/1970 | Flitter | 214/1 Q |
| 2,772,766 | 12/1956 | Kellam | 214/1 Q X |
| 3,259,992 | 7/1966 | Bonwit et al. | 214/1 Q X |

*Primary Examiner*—Robert J. Spar
*Attorney*—C. Garman Hubbard et al.

[57] ABSTRACT

An inverting turret is adapted to receive stacked units of sheet material between opposed relatively movable clamping members, one of said clamping members also being operative as a stack conveyor. After a received stack is clamped to maintain stack integrity, said turret is rotated to invert the stack, whereupon the clamping mechanism is released and said one clamping member is activated to discharge the inverted stack from the turret.

1 Claim, 11 Drawing Figures

APPARATUS FOR INVERTING STACKED UNITS OF SHEET MATERIAL

This application is a division of applicants' pending application, Ser. No. 795,187, filed Jan. 30, 1969 for Apparatus For Automatically Stacking And Inverting Stacked Units Of Sheet Material, now U.S. Pat. No. 3,580,402.

This invention relates to apparatus for assembling flat sheet material, such as cartons, into piled arrangement, and separating therefrom stacks of cartons for delivery to a turret or turning mechanism which inverts the stack and then delivers each inverted stack to a receiving station for further processing or shipment.

Heretofore in this art it has been known to assemble stacks of sheets, such as cartons, and invert them. However, many sizes and thicknesses of cartons are used today and the present practice is to provide a separate or single machine to handle each size of carton. Obviously this practice is highly inefficient and costly to a manufacturer of a variety of packaged goods, such as food products and the like, many of which are packaged in cartons of various sizes.

The present invention solves the problem mentioned above by the provision of a machine and associated apparatus which makes it possible to use a single machine for handling a wide range of various sizes of cartons in a novel manner such that they can be processed without major adjustment or changeover of the machine in accomplishing the purposes of this invention.

It is an object of the invention to provide a novel sheet material handling machine which is capable of handling a wide variety of sheets, such as flat cartons of various sizes and thicknesses.

The invention has as a further object the provision of a novel carton handling and inverting mechanism wherein means are provided which make it possible to readily adapt the machine to handle, invert and discharge neatly stacked cartons of various sizes and thicknesses without requiring means for adjusting the mechanism to accommodate each size of carton.

The invention has as a further object the provision of novel apparatus for forming one or more neat vertical piles of flat cartons in a magazine and separating stacks of predetermined height or number of cartons from each of the piles for delivery from the magazine.

It is a still further object to provide novel means for controlling the movement of an elevator in a magazine in order to dispose cartons assembled in one or more piles thereon in position to enable a pusher to remove one or more stacks of cartons from the magazine.

The invention has as a still further object the provision of a novel carton stack inverting turret having co-operating relatively movable clamping and conveying means whereby the turret is operative, during the operation of the clamping means, to invert carton stacks firmly held between the clamping and conveying means and, after the cartons have been inverted and released, to convey the stacked cartons from the turret to a receiving station without the turret.

The invention is further characterized by the provision of a novel article transfer turret which is selectively operable to firmly hold and invert stacked articles delivered thereto, or to convey stacked articles directly therethrough without inverting them.

With these and other objects not specifically mentioned in view, the invention consists in certain combinations and constructions which will be described fully hereinafter, and then set forth in the claims hereunto appended.

In the accompanying drawings which form a part of this specification and in which like characters of reference indicate the same or like parts.

Figure 1:
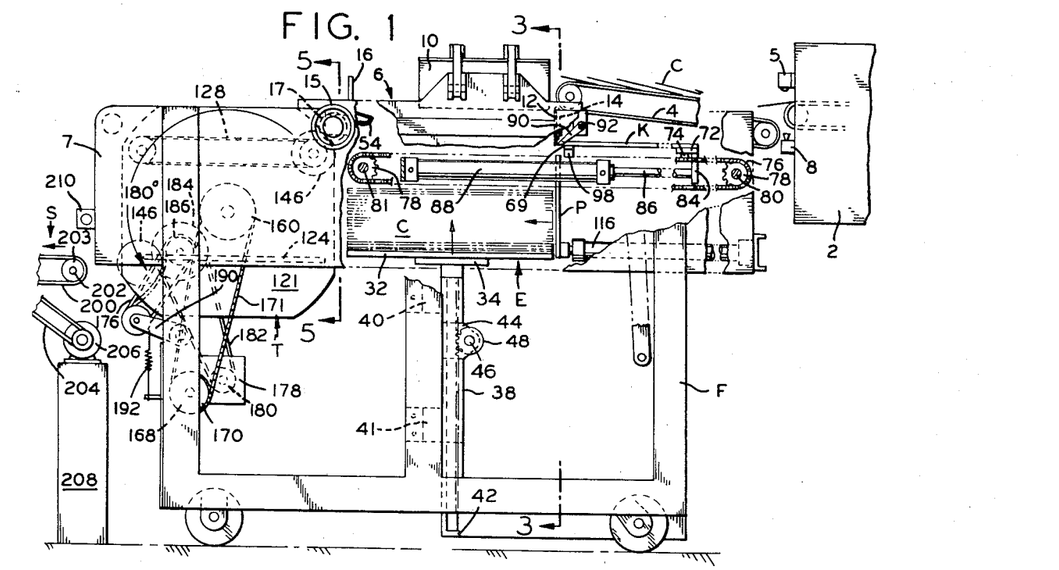
FIG. 1 is a side elevational view with parts broken away to disclose certain details.

Referring to FIG. 1 which shows a side elevation of the machine, cartons C are delivered thereto from a conventional cutting press 2 by a relatively flat conveyor which discharges them onto a relatively slow conveyor 4 in a single file shingled relationship. Cartons are delivered by conveyor 4 into assembly magazine 6 where they are supported by elevator E (shown in its lowered position).

Each carton C entering magazine 6 is engaged by and between oppositely moving joggers or shuffling plates 10 which cause it to be deposited in neatly stacked arrangement in the magazine. A fixed rear stop plate 12, and adjustable front stop plates 16 are provided in magazine 6. Stop plate 12 is secured to a transverse plate 14. Stop plates 16 comprise several members adjustably spaced laterally of the magazine and secured to longitudinally movable support bar 13 adapted to be moved and locked relative to fixed stop plate 12 by means of a handwheel 15 and a lock nut 17 in order that cartons of different lengths can be accommodated in the machine. Since the specific form of adjusting mechanism is not critical to the broader aspects of the invention, further description and showing thereof is deemed to be unnecessary.

When the machine is started, elevator E is normally located in its "up" position. However, due to the action of a sensing unit of the machine, it is lowered progressively until a stack of the desired heighth or number of cartons is reached, whereupon subsequent cartons are intercepted and the elevator is lowered to its lowest limit in order to position cartons stacked thereon for discharge therefrom by a pusher P into a turret T which acts to invert the stacked cartons, as described more in detail hereinafter.

As shown in FIGS. 1 – 4, jogging plates 10 are mounted in opposed pairs on parallel transverse bars 18. Each of these bars has one end connected to an upstanding arm of a suitable bell-crank lever 20 swingably carried in bracket 22 secured to the side frame of the machine. The other arm of each bell-crank lever is pivotally connected to crank arms 23 eccentrically mounted 180° apart on the ends of shaft 24 rotatably supported in bracket 27 attached to side frame of the machine. The other ends of bars 18 are pivotally connected to levers 21 swingably mounted in brackets 25 attached to the opposite machine frame.

In accordance with the disclosed embodiment of the invention fluid actuated reciprocatory and rotary motors are used in actuating several mechanisms of the machine. As described herein, these motors are hydraulically operated. Pneumatically operated motors also could be used.

Shaft 24 is driven continuously by hydraulic motor 26 by conventional pully and belt means at a suitable rate of speed. In this manner plates 10 are moved to and from each other a short distance into and out of engagement with the sides of cartons entering magazine 6, thereby effecting the desired neat disposal of cartons on elevator E.

Figure 2:
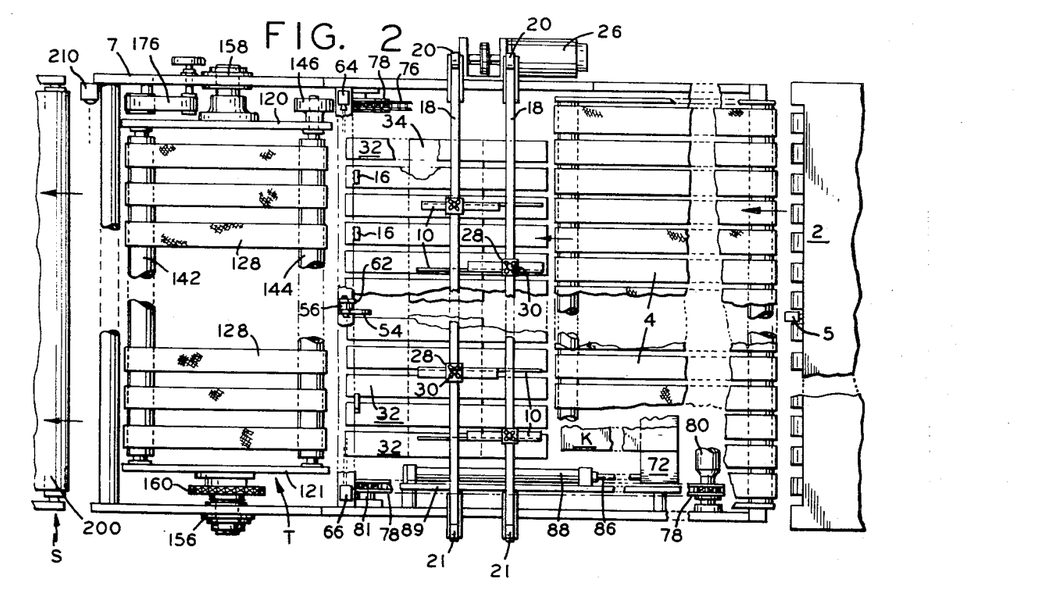
FIG. 2 is a plan view of the machine shown in FIG. 1 with parts broken away.
Figure 3:
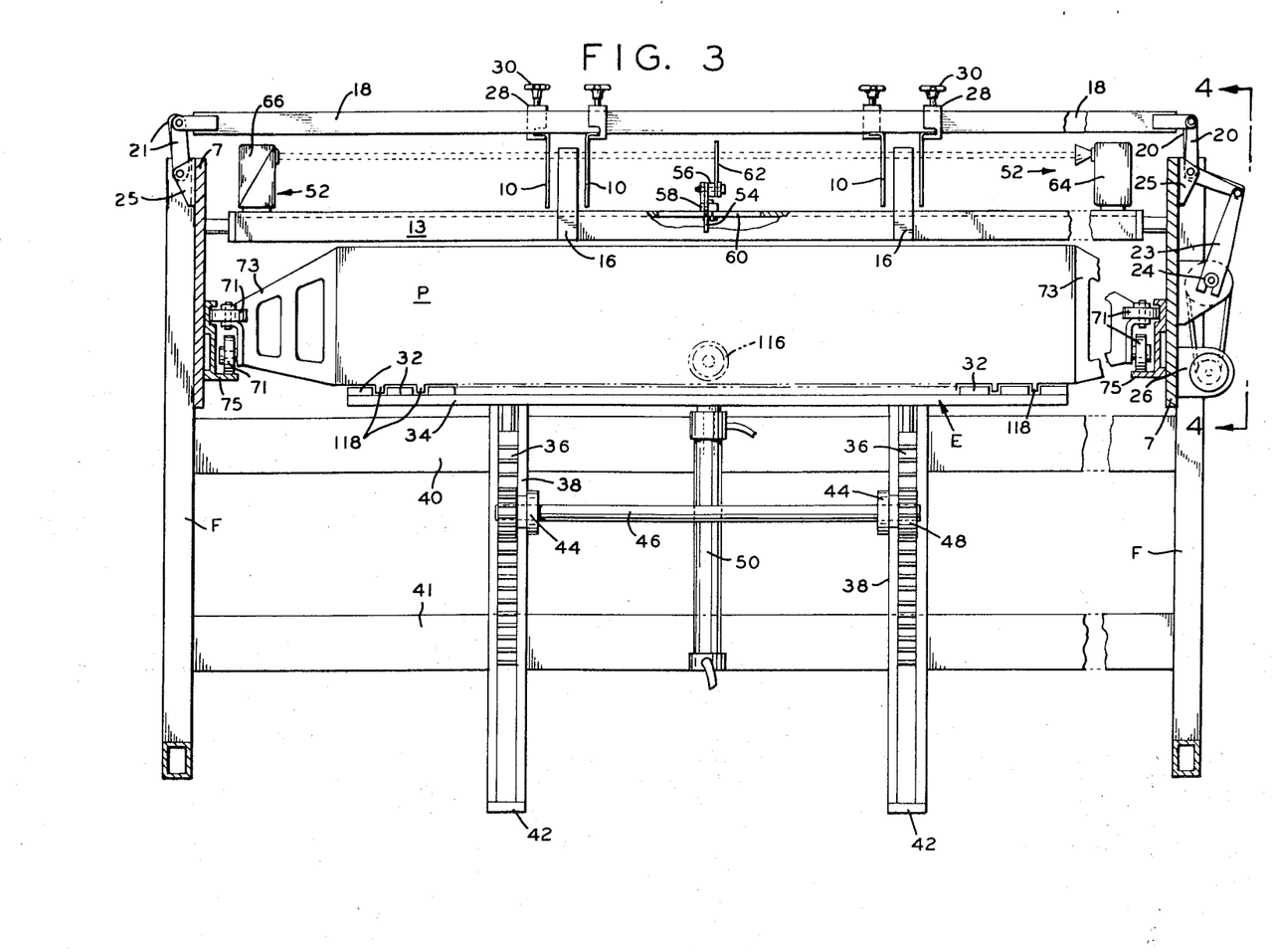
FIG. 3 is a view taken on line 3 — 3 in FIG. 1.
Figure 4:
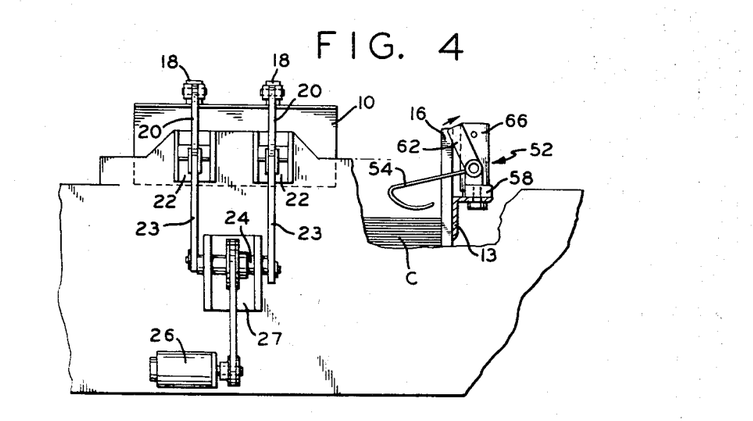
FIG. 4 is a view taken on line 4 — 4 in FIG. 3.

FIGS. 2 and 3 show two pairs of jogging plates 10 mounted on their respective support bars 18. The number of pairs of plates used will depend upon the selected size of carton output of press 2, since one or more sets can be provided, depending upon the size of carton produced and the limits of the machine. In the case of small cartons six or seven single file lines of cartons could be handled in the case of large cartons one or two. Jogging plates 10 are suitably carried by mounting supports 28 which slip over or slide along bars 18. Set screws 30 provide means for locating plates 10 in their selected operating positions.

In the embodiment illustrated elevator E (FIGS. 1, 2 and 3) is formed from a plurality of laterally spaced elongated plates 32 mounted on a transverse bar 34 extending between side plates 7 of magazine 6 on the machine frame F. As best shown in FIG. 3, secured to the underside of and depending downwardly from bar 34 are spaced racks 36 which slide vertically in guide channels 38. These channels are secured to cross frame members 40, 41. The bottom end of each channel may terminate in a stop 42, thereby acting to limit the downward movement of elevator B. Brackets 44 attached to channels 38 rotatably support shaft 46 to which are keyed pinions 48 which mesh with racks 36 in order to insure that at all times the load will be evenly distributed enabling free vertical movement of elevator E.

The elevator is moved up and down by means of a suitable conventional type of double acting reciprocating hydraulic motor 50. The piston end of this motor is connected to the underside of elevator support bar 36, its cylinder end being attached to lower cross frame member 41 (FIG. 3). The operation of motor 50 is described more in detail hereinafter.

Cartons C delivered by conveyor 4 to magazine 6 are counted by any suitable conventional and presettable counting mechanism 5 as they leave cutting press 2 on its relatively rapid moving conveyor which discharges them between counting mechanism 5, which may be photoelectric, and its associated light source 8 onto the relatively slow moving conveyor 4 thereby effecting a shingled arrangement of the cartons advancing to magazine 6. As they are delivered from conveyor 4 between stops 12 and 16 they move beneath the sensing finger 54 of a sensor 52 which may be of a photoelectric type including a light source 64 directed at the photocell of a control unit 66. Finger 54 comprises a downwardly curved feeling portion and is secured to a rockable hub 56 supported in bracket 58 adjustably carried by cross frame angle bar 13. Hub 56 also supports an upright arm 62. When finger 54 is moved upwardly from its "low" to its "high" position by cartons entering the magazine, arm 62 is swung forwardly and breaks a transverse beam of light from source 64 to the photocell of control unit 66. This causes the piston of hydraulic motor 50 to lower elevator E progressively at a rate sufficient to compensate for the build-up of the carton pile and until finger 54 again is located in a "low" position.

It will be appreciated that because of differences in thickness, more thin cartons than thick ones can be stacked or piled on elevator E. Normally, carton thickness is directly proportional to carton size so that for the smaller sizes machine capacity is greater with respect to number of cartons per stack. Also, obviously the smaller the carton size, the larger is the number of stacks that can be concurrently handled by the machine. An important feature of the invention is the great flexibility and versatility of the machine, including the stack inverting mechanism hereafter described. This is due in part to its capability of handling a wide range of sizes of cartons, whereas heretofore in the art it has been necessary to provide a separate mechanism for each size. The advantages of our invention are readily apparent. While reference herein is made to cartons, it will be understood that many types of flat or sheet materials can also be handled in a machine embodying our invention.

It will also be appreciated that normally the cartons being stacked will cover a substantial portion, if not the entire portion, of the surface of elevator E even though FIGS. 2 and 3 show only two pairs of jogging plates 10 located so as to align only two stacks of relatively narrow cartons at laterally spaced-apart positions within the magazine, neither of which stacks would be in registration with the sensing finger 54. Showing of the respective parts in this manner is in the interests of clarity and for the purpose of avoiding unnecessary or redundant disclosure, it being understood that regardless of the size of cartons being stacked and the number of stacks being concurrently formed, the parts will be so adjusted so that one of the stacks being formed will be in longitudinal registration with the sensing finger 54 of sensor 52. Angle member 13 is provided with an elongated slot 60 which permits lateral adjustment of sensing finger 54 above magazine 6 for this purpose.

In response to the delivery of cartons into magazine 6, elevator E is progressively lowered, at a controlled rate, until a stack or stacks of desired heighth or carton number is attained whereupon it is uninterruptedly lowered to its lowermost stack discharge position. The removal of stacked cartons involves the operation of separator means comprising one or more separating and supporting knives K and a discharge pusher P. The number and placement of the knives correspond to the number and placement of the stacks being formed.

A series of knife K (FIGS. 1 and 2) extends transversely between side frames of the machine, and each has a separating and supporting length at least as great as the maximum length of magazine 6. As viewed in FIGS. 1 and 2, knife K (one partly shown in FIG. 2) when extended moves from right to left between adjacent cartons of a stack or stacks in the magazine. Cartons resting on elevator E and beneath knives K constitute the stack to be discharged from the magazine by extension of pusher P. All cartons supported by knives K are so held until pusher P retracts clear of magazine 6 to the position shown, and elevator E has returned upwardly into adjacency beneath plate K, whereupon the knives are retracted to the right, to the position shown in FIGS. 1 and 2, and the cartons which were supported thereby can fall or drop onto elevator E.

Each knife K is attached to a transversely extending movable member 72. Brackets 74 depending from the ends of member 72 are attached to endless horizontally extending chains 76, one on each side, each running on a longitudinally spaced pair of sprockets 78. The rearward sprockets are mounted on a cross shaft 80 supported in bearings carried by the side frames of the machine. The forward sprockets are rotatably mounted on stub shafts 81 secured to said side frames. A bracket secured to the underside of cross member 72 is provided with a depending portion 84 to which is fastened the free end of the piston 86 of a knife actuating hydraulic motor 88 of conventional design. The cylinder of motor 88 is suitably attached in horizontal position to an elongated support plate 89 mounted on the inner face of one of the side frames of the machine (FIG. 2). By means of this construction whenever motor 88 is actuated, plate K is moved in a horizontal plane either into or out of its separating position in magazine 6.

The free end of each knife K is provided with a tapered nose 69 which facilitates its movement between cartons stacked in magazine 6. Preferably fingers 90 are provided which coact with each knife K as it advances towards the magazine. Nose 69 exerts a camming influence on the rounded free end of fingers 90 each of which is swingably mounted on a pin 92 in a bracket suitably mounted on the framework for lateral adjustment. When nose 69 moves against a finger 90, it causes the free end thereof to press against and tend to lift the carton it engages whereby the associated knife K can move more readily between two adjacent cartons of a stack and separate from the stack all the cartons above the horizontal plane of the knife. A cross frame bar 98 secured to the side frames of the machine provides means for supporting the free end portion of knife or plate K.

Pusher P moves to the left from its retracted position, as viewed in FIG. 1, while knives K are in their extended dwell position in magazine 6, and pushes the stacks of cartons beneath knives K into a turret T. The pusher comprises a vertical plate member having a height at least equal to that of the highest stack which can be handled by turret T. It is guided for movement by side rollers 71 carried at its ends in brackets 73, which run on guides and support rails 75 attached to the side frame plates 7 of the machine (FIG. 3).

The lower edge of pusher P preferably is provided with depending projections 118 which extend into the spaces between elevator plates 32, and insure the removal of the lowermost cartons in magazine 6. A conventional hydraulic motor 116 effects the required operation of pusher P. The cylinder end of motor 116 is secured to a cross frame member of the machine. Its piston end is attached to the rear side of the pusher. The stroke of pusher is such that it can deliver various sizes of cartons satisfactorily to turret T without requiring adjustment.

Turret T constitutes a very important feature of the mechanism because of the manner in which it coacts with the several parts of our machine described hereinabove, and more particularly due to its capability of inverting stacks of cartons of various sizes and thicknesses without the need for any adjustments whatsoever.

Referring to FIGS. 1, 2, 5, 6 and 7, turret T comprises two laterally spaced side frame members 120 and 121, connected by upper and lower cross channels 122 and 123, respectively, and cross tie rods 140. The turret is located between the side frames of the machine and its width is substantially the same as that of magazine 6. Turret T can accommodate the same number of stacks of cartons as magazine 6.

Figure 5:
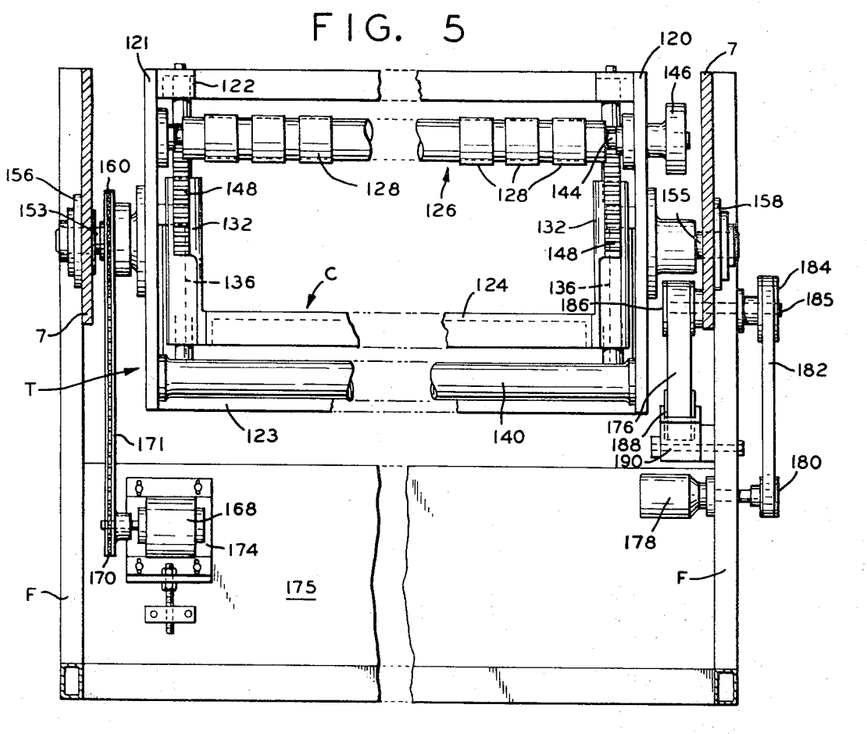
FIG. 5 is a sectional view taken on line 5 — 5 in FIG. 1.
Figure 6:
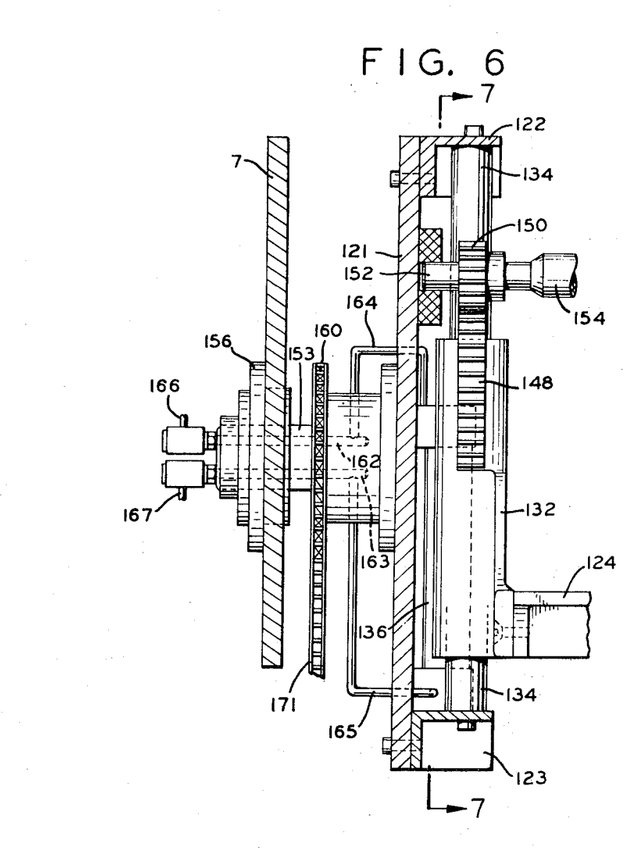
FIG. 6 is a partial sectional view showing details of the turret operating mechanism.
Figure 7:
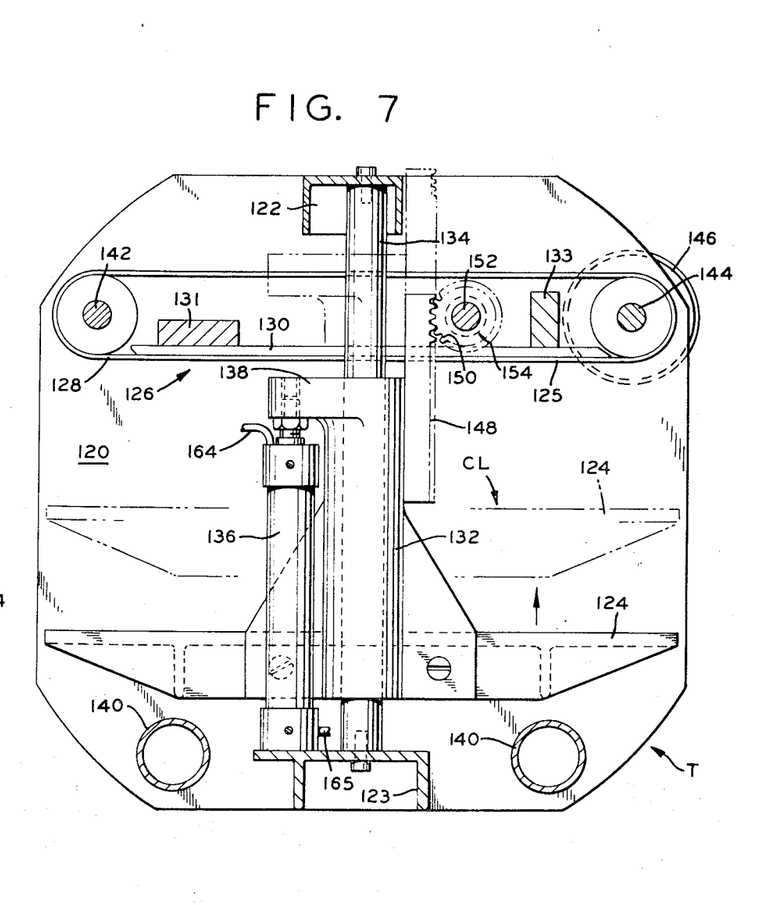
FIG. 7 is a view taken substantially along line 7 — 7 in FIG. 6.

As best shown in FIGS. 5, 6 and 7, the turret is provided with a transversely extending stack clamp CL which includes plate 124, which in the illustrated embodiment is a casting, and a coacting opposed clamping and conveying unit designated 126. This unit comprises at least one, and preferably several, endless belts 128 having their active laps 125 substantially parallel to the operative plane of plate 124, and backed up by a pressure plate 130 carried by cross bars 131, 133 having their ends attached to the inner faces of frame members 120, 121.

Plate 124 is mounted for vertical movement. As shown herein, unit 126 is fixedly mounted in turret T and clamp plate 124 is supported for movement to and from unit 126 to firmly grip or clamp one or more laterally spaced stacks of cartons therebetween, thereby preventing any shifting of individual cartons of a stack in the turret during the inverting operation.

Clamp plate 124 is mounted for movement towards and away from unit 126 by means of slide bearings 132 attached to its sides, as by bolts, and slidable on slide shafts 134 having their ends fixed to cross channels 122, 123. In the form shown, clamp plate 124 is actuated by two reversible hydraulic motors 136 of suitable conventional design. One motor is positioned at each side of the plate (FIG. 5). The cylinder end of each motor is secured to a flange of channel 123. The piston ends are attached to an arm 138 formed on the slide bearings 132.

Referring to FIGS. 1, 2, 5 and 7, turret T supports two transverse shafts 142 and 144 on which are mounted the pulleys supporting belts 128 which constitute the turret conveyor. Shaft 144 carries a driving roller 146, provided with an elastomeric tire of rubber or other frictional surface material and, as described hereinafter, drives belts 128 which convey inverted stacks of cartons out of the turret.

A rack 148 is attached to each slide bearing 132 and positioned in meshing engagement with pinions 150 mounted adjacent the ends of shaft 152 journalled in bearings mounted on the inner faces of the side frames of the turret. Shaft 152 functions as a stabilizing means in insuring substantially equal force at both ends of clamp plate 124 by operation of motors 136 in effecting its movement into and out of its clamping relationship relative to unit 126.

Turret T is mounted for rotation by trunnions 153, 155 supported in suitable conventional bearings 156, 158 in the side frames of the machine. Trunnion 153 is attached to sprocket 160 having a hub secured to and concentric with turret side frame 121. Bores 162, 163 formed in trunnion 153 and sprocket 160 and flexible conduits 164, 165 provide passages for conducting hydraulic fluid to and from the left-hand motor 136 from suitable conventional swivel joint fluid couplings 166, 167 in the machine's hydraulic circuit. Similar means, not shown, are provided for conducting fluid to the right-hand motor 136.

Rotation of turret T is accomplished by means of a rotary type of conventional hydraulic motor 168. The shaft of this motor mounts a sprocket 170 on which runs sprocket chain 171 driving sprocket 160. The ratio of sprocket 170 to sprocket 160 is such that when sprocket 170 is rotated 280° sprocket 160 is rotated 180°. This results in the rotation of turret T through 180° whereby cartons stacked in and held by the mechanism described are inverted. Immediately upon this operation being concluded, motors 136 are reversely operated to release plate 124 from its clamping relationship with unit 126, and the now inverted cartons freely resting on conveyor 126 which is now in operation, as hereafter described, are removed from the turret. When stacked cartons have been discharged by conveyor 126 from turret T, the turret motor 168 is operated in reverse thereby returning the turret to its stack receiving position. Motor 168 is mounted on bracket 174 which is adjustably supported in known manner on a cross frame plate 175, as shown in FIG. 5.

Referring to FIGS. 1, 5 and 7, drive wheel 146 extends outwardly from turret side frame 120. When the turret is turned to invert cartons, wheel 146 is forced into resilient driving engagement with a continuously driven driving belt 176, which is driven by a hydraulic motor 178. This motor is mounted on the frame of the machine, as shown in FIG. 5. Its shaft carries a pully 180 on which runs driving belt 182 running on and driving pulley 184 on shaft 185 journalled in bearings in the side frame of the machine. Shaft 185 carries a pulley 186 on which belt 176 runs. This belt also runs on an idler pulley 188 rotatably carried by lever 190 swingably mounted on the machine frame. A relatively heavy tension spring 192 attached at one end to lever 190 and at its other end to the machine frame maintains belt 176 constantly under resilient tension. The tractive surface of wheel 146 is such that when it is forced into engagement with belt 176 as the result of the rotation of turret T, it picks up the drive from belt 176 and thereby drives belts 128 of the turret conveyor which conveys stacked cartons out of turret T to receiving station S. The drive of conveyor 126 is discontinued as soon as wheel 146 is moved out of engagement with belt 176 as turret T is rotated in its reverse path of travel to again position it for delivery of a stack or stacks of cartons thereto.

Station S, as shown herein, may comprise an endless conveyor 200 running over a pulley on shaft 202 and a pulley on a shaft (not shown) which is driven conventionally through a belt 204 by a motor 206 supported on a stand 208. As stacked cartons are discharged by the turret conveyor from turret T, they break a light beam directed to a conventional type of photocell control unit 210 and close a circuit to motor 206, whereupon conveyor 200 is driven to advance the stack or stacks of cartons discharged from turret T in properly arranged and oriented condition for erection in the further course of packaging or for shipments, as desired. When stacks on conveyor 200 have been moved to the removal position (not shown) the beam of light to the photocell unit is restored to stop motor 206.

Under some conditions it may be desired to use turret T as an intermediate conveying apparatus in effecting the delivery of stacked cartons or sheet material to a receiving station without inverting them. In such case, the rotary hydraulic motor 168 is maintained in its turret inverting position by means described more in detail hereinafter until such time as it is again desired to periodically invert the turret as described hereinabove.

The operation of the machine is as follows. Cartons are delivered in shingled single file arrangement to magazine 6 where, depending upon the number of lines of cartons being fed thereto, one or more vertical piles of cartons are formed in the magazine and supported by elevator E. Sensor 52 activates the progressive lowering of elevator E so as to accommodate stacks of a desired number or stack height whereupon the separators or knives K move between adjacent cartons of a stack and separate the stack to prevent further cartons from being added to those stacked on the elevator, and then dwell at this separating position of their movement. The elevator is then lowered to its lowermost position. The pusher P is then actuated to push the stack or stacks of cartons beneath the knives K and supported by the elevator into the turret where the stacks of cartons are clamped and inverted by the 180° rotation of the turret. Prior to the rotation of the turret, pusher P retracts, and thereafter elevator E moves up to a position adjacent extended knives K which then withdraw to an inoperative position. Subsequent to the rotation of turret T which inverts the material carried thereby, clamping plate 124 is moved away from conveyor unit 126, thereby removing clamping pressure on the cartons which now rest free on turret conveyor belts 128. This conveyor now is driven and conveys the stacked cartons out of the turret and to a receiving station S, properly arranged and oriented and ready for set-up and filling or for transfer to a different location for shipment.

Figure 8:
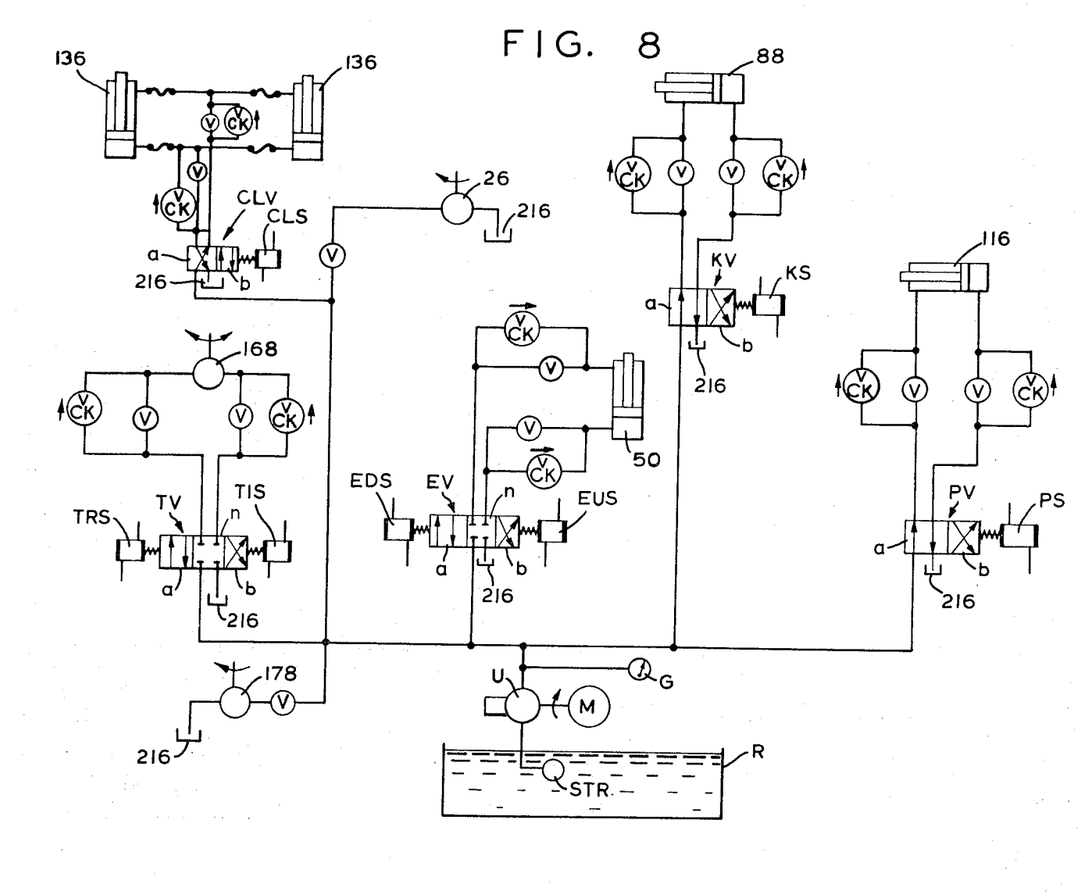
FIG. 8 is a schematic diagram of a suitable fluid actuating circuit for the machine.

In the fluid operating circuit shown in FIG. 8, several manually operated valves V and check valves Vck of suitable conventional design are provided. The operating positions of valves V are set manually as required to control the flow of pressurized fluid to and from their respective motors in the operation of the machine. Hyraulic fluid is contained in a reservoir R and is pumped by pump U driven by motor M under desired pressure to the several operating motors of the machine through the fluid system shown in FIG. 8. A suitable strainer STR and a pressure gauge G also are provided. Elements 216 indicate diagrammatically the return conduits by which fluid is returned to reservoir R.

Knives K are moved into and out of their operative position in response to the actuation of motor 88. This is effected by the energization and deenergization of a solenoid KS controlling a suitable double ported conventional type of solenoid actuated two-position valve KV. In the fluid circuit referred to herein, valves PV and CLV also are similar in construction and operation to valve KV. Valves EV and TV are of suitable conventional design. They are provided with a three-position movable unit and are actuated by two solenoids for moving their units, as described hereinafter. The double position valves have sections $a$ and $b$ for effecting, respectively, the withdrawal and the advance of the pistons of motors 88, 116 and 136. The three-position valves have sections $a$ and $b$ and also a centering or neutral section $n$ which effectively interrupts the circuit to and from the respective motor. In all cases the valves are shown in their normal position when their respective solenoids are deenergized and their armatures retracted by the associated expansion springs.

When solenoid KS is energized, valve KV is actuated such that section *b* is positioned to allow the flow of pressurized fluid to the piston face of motor 88 which causes the piston to extend knives K into an operative stack separating position. This solenoid is maintained energized until pusher P has pushed the stack or stacks of cartons beneath a knife K from magazine 6 into turret T and returned to its retracted or inoperative position, and elevator E has been moved upwardly into its topmost position adjacent the underside of knives K. When this sequence of operations has taken place, knive solenoid KS is deenergized, and its expansion spring effects the positioning of section *a* in the line such that the piston of motor 88 is forced to the right, as viewed in FIG. 8, thereby returning knives K to their inoperative position where they remain until the next cycle of operation.

Pusher P is actuated by motor 116 by means of solenoid PS. In FIG. 8, solenoid PS is deenergized and the pusher is thus maintained in its inoperative position since section *a* of valve PV is in the direct pressurized fluid line. When knives K are at dwell (extended) in their stack separating position, and the elevator is at its lowermost position, solenoid PS is energized. This causes the movement of section *a* to the left, as viewed in FIG. 8, thereby locating section *b* in the fluid line and causing fluid under press to force the piston of motor 116 to the left, FIG. 8, which effects the extension of the pusher through magazine 6 as it pushes stacked cartons and the like from the magazine into turret T. As soon as this takes place, solenoid PS is deenergized, its spring effects the movement of section *a* of valve PV into the line and the piston of motor 116 causes the retraction of pusher P to its rest position, where it remains until the next stack or stacks of cartons is to be pushed into the turret.

Elevator E is lowered progressively to its discharge position in response to the extension of knives K. The piston of motor 50 whose rod is attached to elevator E is moved up and down under the control of solenoids EDS and EUS which operate hydraulic valve EV. In the position of the sections of valve EV shown in FIG. 8, section *b* is in the pressure line, and provides a fluid lock-in which prevents movement of elevator E until either sections *a* or *b* are in the fluid line. When solenoid EDS (Elevator-Down) is energized, section *a* is moved into the line and the piston of motor 50 lowers the elevator. The direct lowering movement of the elevator to its lowermost position is controlled by the operation of knives K which, after the elevator has been lowered progressively to accommodate delivery to the magazine of a sufficient number of cartons to form a stack or stacks of prescribed number of cartons or height, are extended and cause the energization of solenoid EDS which remains energized until the EUS (Elevator-Up) solenoid is energized near the end of a cycle. When solenoid EUS is energized, valve section *b* is moved into the line thereby establishing a flow of pressurized fluid to the face side of the piston of motor 50 which causes the lifting of elevator E to its uppermost position adjacent the underside of extended knives K. This movement being effected, solenoid EUS is deenergized by opening of associated contacts shown in the wiring diagram of FIG. 9, which results in the positioning of section *n* in the line and causes elevator E to be held in stationary position until subsequent energization of solenoid EDS in the following cycle. The operation of three-section valve TV in effecting the rotation of turret T is somewhat the same as that of three-section valve EV for elevator E. When turret T is receiving stacked articles, its rest position after being returned by solenoid TRS (Turret-Return) is maintained by the deenergized condition of solenoids TIS (Turret-Invert) and TRS which causes neutral section *n* of valve TV to be located in the line of the pressurized fluid, thereby locking the turret against movement until solenoid TIS is again energized. When either of these solenoids is energized either section *a* or *b* of valve TV is located in the line, and turret T is rotated (inverted) either from or to carton receiving position relative to magazine 6 and to or from discharge position relative to receiving station S, as heretofore described.

Clamp plate 124 is caused to move into and out of its clamping position by motors 136. Fluid under pressure is conducted to motors 136 to move their pistons by means of Clamp Solenoid CLS. When this solenoid is energized, valve CV section *b* is moved thereby into the line whereupon pressurized fluid can flow into motors 136 against the faces of their pistons and move plate 124 to its clamping position relative to unit 126 where it remains as long as solenoid CLS remains energized. As soon as turret T is rotated to its discharge inverted position in response to the energization of solenoid TIS, solenoid CLS is deenergized, and section *a* is moved into the line by the expansion spring for solenoid CLS whereby pressurized fluid now forces the piston in the opposite direction, and clamping plate 124 releases its pressure on the stacked articles in turret T. Upon discharge of the stacked cartons or other goods from turret T, solenoid TRS is energized to cause the counter rotation (return) of turret T by means of its rotary hydraulic motor 168 to reposition the turret for delivery in the next cycle of stacked cartons thereto by pusher P. Upon deenergization of solenoid TRS, the section *n* of valve TV is maintained in centered position by the springs for solenoids TIS and TRS, and the turret is held in dwell position awaiting delivery of stacked cartons thereto in the next cycle by pusher P.

Motors 26 and 178 are continuously driven by pressurized fluid pumped therethrough from source reservoir R and which flows back to the reservoir through conduits (not shown) leading from fluid drain elements 216.

Figures 9, 9A:
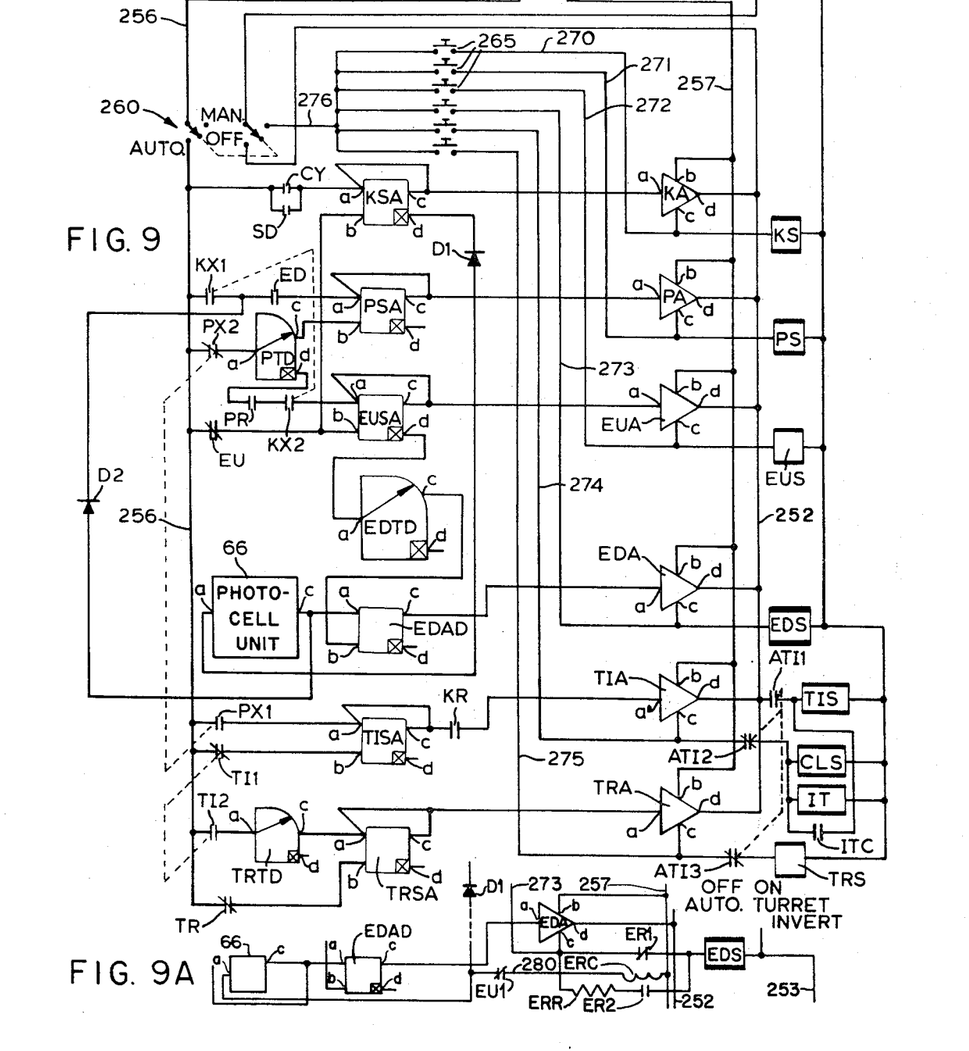
FIG. 9 is a schematic wiring diagram of a suitable control circuit for a machine embodying the invention.
FIGS. 9A, 9B are diagrams of optional circuit features.

FIG. 9 illustrates suitable circuitry which may be employed in conjunction with the fluid circuit of FIG. 8 for operating the respective parts of the mechanism heretofore described at the proper time and in the proper sequence. The circuitry, briefly described, comprises an AC portion across which are connected by suitable switching means load devices which for the most part are the fluid valve actuating solenoids shown and described with reference to FIG. 8. The alternating current is of a sufficiently high voltage to fully energize any one of said load devices, and in the present instance is of approximately 120 volts.

The other portion of the circuit may be considered the control portion operating under a relatively low DC voltage, preferably about 25 volts, and includes a number of switching means performing a variety of logic functions and comprising preferably solid state modules. As with the load devices, the switching means are designated by the initials of terms identifying the type of logic function performed thereby and the part of the mechanism to which it directly relates. For example, reading down the central portion of the diagram, the topmost device is the knife "Sealed And" switch KSA having two input terminals *a* and *b* and two output terminals *c* and *d*. The output of this switch from terminal *c* is fed as an input to the knife power switch or amplifier KA which operates as a relay upon completion of a control circuit from one side of the DC portion to input terminal *a* which is interiorly joined to output terminal *b* which is connected directly to the other side of the DC portion of the circuitry. This in turn operates to complete a circuit in the high voltage AC portion of the circuitry which includes terminal *c* which is interiorly joined to output terminal *d* to thereby energize the associated load device or solenoid KS, heretofore described.

As illustrated, the DC control portion of the circuitry includes, in addition to the "Sealed And" module KSA, four additional "Sealed And" modules, these being PSA for controlling the pusher P; the EUSA module for controlling the elevator up solenoid EUS; the TISA "Sealed And" module for controlling the turret invert solenoid TIS, the clamp solenoid CLS and an industrial timer IT, the contacts of which, ITC, are closed after a preset adjustable time delay which prevents energization of solenoid TIS until the clamp solenoid CLS has been energized a sufficient time interval to render turret clamp CL (FIGS. 5 and 7) effective; and the TRSA module for controlling the turret retract solenoid TRS. Each of these "Sealed And" modules continually produces an output signal on either its output terminal *d* or *c*, depending upon whether the logic function as indicated by the presence or absence of signals on its two input terminals *a, b* has been achieved. In the absence of any input signal the "Sealed And" modules will emit an output signal continually from its output terminal *d* until there occurs a coincidence of input signals at both its input terminals *a* and *b*, whereupon the output signal switches from output terminal *d* to output terminal *c*. The switched output emitted from terminal *c* continues for the duration of the input at terminal *b* since the output from terminal *c* has a feedback connection to input terminal *a* which maintains the logic function of the module met even though the initiating signal over the line to terminal *a* is discontinued.

The control portion of the circuit also includes an "And" module EDAD for controlling through an associated power switch or amplifier EDA the elevator-down solenoid EDS. This "And" module is shown with two input terminals *a, b* and two output terminals *c, d*, and it functions in the absence of coincidence of input signals to produce an output signal at its terminal *d*. Upon coincidence of input signals at its terminals *a, b*, it switches to emit an output at its output terminal *c* for the duration of said coincidence of input signals. It will be noted that in certain instances the unswitched or "Not" output signal from terminal *d* of the above described "Sealed And" and "And" modules is not utilized for control purposes.

Also included in the control portion of the circuitry are "Time Delay" modules which are preferably adjustable with respect to the length of delay and include the pusher "Time Delay" module PTD, the elevator-down "Time Delay" module EDTD and the turret retract "Time Delay" module TRTD. Each of these "Time Delay" modules is shown as having one input terminal *a* and two output terminals *c, d*. Each module functions in the absence of an input at its terminal *a* to emit an output signal at its "Not" terminal *d*. The output of these "Time Delay" modules switches or transfers from terminal *d* to terminal *c* after the predetermined delay following receipt of an input signal at its terminal *a*, assuming that the input signal continues throughout the delay period. The output at terminal *c* continues thereafter for the duration of the input signal which, when discontinued, causes the output to switch back to terminal *d* resetting the module for achieving the same delay upon receipt of the next input signal. Should the input signal fail to continue throughout the delay period, the device resets in preparation for receipt of a subsequent input signal and without affecting the continuing "Not" output signal at its terminal *d*. The photoelectric cell unit 66 of the carton sensor means 52 heretofore described is represented in FIG. 9 as a control element of the control portion of the circuitry. This element includes one input terminal *a* and one output terminal *c*. Its function is to emit an output at its terminal *c* only when the light beam of the sensor mechanism heretofore described is interrupted by the finger 62 of said sensor mechanism so as to block the light beam from striking the photoelectric cell incorporated therewith. In the presence of light on the photoelectric cell of this unit, an input at its terminal *a* will not produce an output at its terminal *c*.

The control portion of the circuitry also includes a number of contacts of switches, mainly in the input lines to the aforesaid control modules, which are of the single-throw type and are so mounted on the associated parts of the apparatus as to be mechanically actuated by the respective part in response to its movement from one position to another. These mechanically actuated switches may be of any suitable type such as micro-switches, magnetically operated reed-switches, or the like, and are shown in the condition (open or closed) they assume when the respective part of the apparatus which actuates them is in a non-actuating position. For example, the diagram of FIG. 9 shows two such pairs of contacts connected in parallel in the line running from negative conductor 256 to input terminal *a* of control module KSA, these being contacts CY and contacts SD. The former are contacts operated by the cyclomometer or counter 5 which are normally open and are closed momentarily when the number preset in the counter has been reached. The latter contacts SD are associated with the elevator mechanism for providing alternate control on the basis of stack-height detection. This enables the mechanism to operate (form carton stacks) in accordance with the height of a stack of cartons resting on elevator E, regardless of the number of cartons therein, as well as in accordance with the number of cartons in the stack, regardless of the stack height. Contacts SD are normally open, as shown, and are closed when the elevator E has descended a predetermined distance below the operative plane of knives K, thereby enabling the production of stacks having a height equivalent to said predetermined distance. The placement of these contacts is adjustable so that any desired stack height may be selected. When the elevator has reached said predetermined distance, the stack height contacts SD are closed by the elevator mechanism to thereby complete a circuit, as will be hereinafter more fully described, to the input terminal *a* of control module KSA. The switching of KSA to extend knives K will hereinafter be considered, for purposes of description, initiation of a machine operating cycle. As will be noted, some of the mechanically actuated contacts are ganged together such as, for example, contacts KX1 and KX2; PX1 and PX2; TI1 and TI2, etc. Other contacts in the circuit are manually operated as indicated clearly in the diagram of FIG. 9 by the legend "MAN."

Electrical power is supplied to the circuitry from a suitable AC source to a step-down transformer 251, the secondary winding of which delivers an AC supply of appropriate voltage (120 volts at 60 cycles in this instance) over conductors 252, 253 which supply the power for driving the various load devices heretofore mentioned. Connected across conductors 252, 253 through a suitable "on-off" switch, if desired, is another step-down transformer 254, the secondary winding of which feeds a suitable rectifier 255, preferably of the full wave type and which produces a DC output of appropriate voltage (25 volts in this instance) over negative conductor 256 and positive conductor 257. Connected in the DC conductor 256 and the AC conductor 252 is a manually actuatable double-pole, double-throw switch 260 which is shown in its neutral or "off" position, but which when set in its automatic "auto" position provides continuity over conductor 260 to the various modules of the control portion of the circuitry along with continuity over AC conductor 252 which aforesaid constitutes one side of the higher voltage AC load energizing portion of the circuitry.

A typical cycle will now be described, assuming that the rectifier 255 is connected to the power source and the switch 260 is set in its "auto" position. For purposes of description, a cycle will be considered to start at the moment the knives K are extended into the magazine 6 to interrupt the build-up of a carton stack or stacks resting on the elevator E and to start the formation of a new or subsequent stack or stacks supported by the extended knives K. As aforesaid, the apparatus is adapted to form carton stacks of either a predetermined number of cartons per stack, or of predetermined stack height regardless of the number of cartons therein. When it is desired to form stacks each of a predetermined number of cartons, the counter or cyclomometer 5, upon reaching the preset or predetermined count, momentarily closes its contacts CY which serve to connect conductor 260 to the $a$ terminal of the "Sealed And" module KSA controlling operation of knives K. In the latter part of the preceding cycle, the elevator E will have returned to its uppermost position causing the knives K to retract, and in so doing drop or transfer all cartons which had been intercepted thereby to the elevator while in its uppermost position. It should, of course, be understood that the lowermost carton of a partial stack transferred to the elevator E by retraction of knives K represents the start of a new stack count by the cyclomometer 5. Additional cartons continue to be dropped onto a stack until the capacity of the magazine 6 is reached to result in blocking the light beam of the sensor 52, thereby causing an output signal from the photoelectric cell unit 66 at its terminal $c$ to provide an input signal to the elevator-down "Sealed And" module EDAD at its input terminal $a$. When the elevator E is at its uppermost position, the logic function of the knife "Sealed And" module KSA is not met since there can be no input to its terminal $b$ by reason of the contacts EU being open when the elevator is in its uppermost or fully raised position. Consequently, module KSA is emitting an output from its terminal $d$ to the input terminal $a$ of unit 66 through diode D1 so that when the light beam of the sensor is interrupted, an input signal is fed from output terminal $c$ of unit 66 to input terminal $a$ of the elevator-down "And" module EDAD. Under the same conditions, an input signal is concurrently applied to terminal $b$ of the module EDAD after the "Time Delay" provided by module EDTD. This input originates with the elevator-up "Sealed And" module EUSA at its output terminal $d$, since under these conditions the elevator-up contacts EU, which also control inputs to terminal $b$ of module EUSA, are open causing the module to emit a "Not" signal at its output terminal $d$. This "Not" output signal, after the delay provided by module EDTD, is fed to input terminal $b$ of the "And" module EDAD, thus meeting the logic function of this latter module to result in an output signal at its terminal $c$. This output signal runs to input terminal $a$ of the elevator-down "Power Switch" or "Amplifier" EDA which is connected to the other side of the control portion of the circuitry at its terminal $b$, thereby switching on the elevator-down solenoid EDS to cause lowering of elevator E as long as the light beam of sensor 52 remains interrupted. The delay provided by module EDTD allows sufficient time for the knives K to fully retract before the elevator can be lowered by the sensor means after the elevator reaches its extreme up position. Lowering of elevator E increases the capacity of the magazine 6, and the extent to which the elevator E lowers is dependent largely on the response time of unit 66. If desired, an adjustable or presettable "Time Delay" could be incorporated in the output side of unit 66, the delay being of the delay-on-break type, so as to continue the lowering movement for a predetermined time interval after interruption of the light beam of sensor 52 is terminated. The initial progressive lowering movement of the elevator results in closing of the EU contacts thereby connecting conductor 256 to the $b$ terminal of the module KSA which continues to emit a signal from its $d$ output since the $a$ input terminal of module KSA has not yet been connected to conductor 256. Cartons continue to build up on the elevator E and, depending upon the setting of the cyclomometer 5 or the stack height detector contacts SD, will result in continuing the progressive lowering movement of the elevator to accommodate the incoming carton blanks under control of the sensor mechanism 52. As soon as either the preset count has been reached or a stack of predetermined height has been reached, either the contacts CY or the contacts SD will establish a connection between conductor 256 and the $a$ terminal of the knife "Sealed And" module KSA which thereupon switches its output, from terminal $d$ to terminal $c$, which is now fed to terminal $a$ of the associated power switch or amplifier KA, the $b$ terminal of which is connected to the positive conductor 257 thereby completing a control circuit which connects the associated solenoid KS across the higher voltage AC load circuit via terminals $c$, $d$ of the amplifier KA. As heretofore explained relative to the hydraulic circuit of FIG. 8, energization of solenoid KS activates the knife valve KV which operates to project or extend the knives K between adjacent cartons of the pile resting on the elevator to separate the pile into a lower stack of predetermined carton number or stack height and another stack starting at the operative plane of the knife.

It will be noted that as soon as the knives are extended, the sensor mechanism 52 becomes inoperative since there is no longer any input from module KSA to the photoelectric cell unit 66 at its terminal a.

Extension of the knives to their full limit operates to close the knife-extended contacts KX1 and KX2. Closure of contacts KX1 connects DC conductor 256 with the input terminal a of the elevator-down "And" module EDAD through diode D2 and in so doing bypassing the photoelectric cell unit 66. The closure of contacts KX2 has no effect at this time since these contacts are in the line running from the d output terminal of the pusher "Time Delay" module PTD which, at the time the knives K are extended is in the switched condition producing an output at its output terminal c. The other input signal to the b terminal of module EDAD originates with the d terminal of the elevator-up "Sealed And" module EUSA which at this time is unswitched since the elevator-up contacts EU in the input line to its b terminal are necessarily open. The output from terminal d of module EUSA runs to the input terminal a of elevator-down "Time Delay" module EDTD and thence after the predetermined delay to the input terminal b of the elevator-down "And" module EDAD to thereby fulfill the logic function of this latter module. It thereupon produces an output at its terminal c which completes the control circuit to the positive conductor 257 for the associated power switch or amplifier EDA to result in energization of the elevator-down solenoid EDS activating elevator valve EV (see FIG. 8) to drive the elevator uninterruptedly to its lowermost position. The reason for provision of the "Time Delay" EDTD, which is a delay-on-make triggered by opening of the elevator-up contacts EU, is to allow an adequate period of time for the knife K to subsequently retract near the end of a cycle before the elevator E can be again lowered by energization of the solenoid EDS.

The complete lowering of the elevator E closes the elevator-down contacts ED in the input line to terminal a of the pusher "Sealed And" module PSA which carries the control circuit from negative conductor 256 to this point, since the knife-extended contacts KX1 at this time are also closed. At the same time, an input from conductor 256 is fed to terminal b of module PSA through the pusher extended contacts PX2 and the pusher "Time Delay" module PTD. These coincident and concurrent input signals at terminals a, b of module PSA fulfill the logic function of this latter module to complete the control circuit through the associated power switch or amplifier PA thereby energizing the pusher solenoid PS which is aforementioned results in the projection or extension of the pusher P which transfers or sweeps the carton stack or stacks from the elevator E onto the clamp member 124 of turret T.

The projection of the pusher P to its full limit in transferring the carton stacks to the turret T operates to open the pusher-extended contacts PX2 and close the pusher extended contacts PX1. Opening of contacts PX2 resets the pusher "Time Delay" PTD thereby removing the input to terminal b of module PSA, thus deenergizing the pusher solenoid PS. This restores the pusher valve PV (see FIG. 8) whereby the fluid circuit operates to retract the pusher P to its normal nonextended position. As the pusher is being retracted, contacts PX2 will close, thus again triggering the pusher "Time Delay" PTD which is a delay-on-make, the reason for the delay being to enable the pusher P to fully retract and the elevator E to begin rising before the input to terminal b of PSA is reestablished, since otherwise the pusher P would merely oscillate idly preventing completion of an operating cycle. The delay period is preset so as to allow adequate time for the complete retraction of the pusher P. During the delay period, the delay module PTD emits a signal from its output terminal d over a line running to plunger-retract contacts PR and knife-extended contacts KX2 to the input terminal a of the elevator-up "Sealed And" module EUSA. This input line, however, is not established until the pusher P is fully retracted so as to close its associated contacts PR, but since the plunger is fully retracted, still within the delay period of delay module PTD, an input is provided at terminal a of the elevator " Sealed And" switch EUSA concurrently with another input through elevator-up contacts EU to the b terminal of module EUSA to result in completing the control circuit through the elevator-up amplifier EUA thus energizing the elevator-up solenoid EUS. By the time the delay period has ended, the elevator E has started to rise, opening the elevator-down contacts ED, and in so doing preventing repeated oscillation of the Pusher P, since when the input is reestablished at terminal b of PSA, there no longer is a concurrent or coincident input at its terminal a. It will also be noted contacts PR require that the pusher be fully retracted before elevator E can start to rise, thereby avoiding jamming of the respective parts. The switching of the output from terminal d to terminal c of the delay module PTD does not affect the control circuit energizing the elevator-up solenoid EUS since the "Sealed And" module EUSA continues in the switched condition by reason of the continuing input at its terminal b until the elevator reaches its fully raised position immediately below the projected knives K, whereupon it operates to open the elevator-up contacts EU, thus switching back the module EUSA and deenergizing the elevator-up solenoid EUS.

The opening of contacts EU also removes the input to terminal b of the knife "Sealed And" module KSA thereby switching back this latter module to result in deenergization of the knife solenoid KS to restore valve KV causing the fluid circuit to return the knives to their fully retracted position. At the same time, the switching back of the module KSA reestablishes the output from its terminal d to again put the elevator E under control of the photocell unit 66 of the carton sensor unit 52.

The closure of the pusher-extended contacts PX1 resulting from the complete extension of the pusher P in transferring the carton stack to the turret establishes an input to terminal a of the turret invert "Sealed And" module TISA. A coincident input to terminal b of this module from negative conductor 256 has been established through the closed turret-invert contacts TI1. Thus the logic function of module TISA is fulfilled when the pusher is fully extended thereby switching the module to create an output at its terminal c. This output runs to an associated turret-invert amplifier through knife retract contacts KR so that when said contacts KR are closed by the knives when restored to their fully retracted position, the control circuit through amplifier TIA will be completed thereby switching the amplifier to initiate a stack inversion operation, assuming the automatic turret-invert switch mechanism is set for "ON," as shown, for automatic operation. Switching of amplifier TIA completes a load circuit across conductors 252, 253 through the clamp solenoid CLS and the industrial timer IT, connected in parallel, and contacts ATI2 of the automatic turret-invert switch mechanism. Energization of clamp solenoid CLS operates the clamp valve CV (see FIG. 8) causing the clamp plate member 124 to rise and elevate the stack or stacks thereon into gripping contact with the conveyor belts 128 of the turret mechanism, heretofore described. Energization of timer IT, which serves a delay-on-make function, initiates a time delay preceding energization of the turret-invert solenoid TIS. After a predetermined delay preset into the timer, the timer closes its associated contacts ITC to complete a circuit through the turret-invert solenoid TIS which, as heretofore described with reference to FIG. 8, operates valve TV to result in 180° inversion of the turret, with the carton stack or stacks clamped therein to maintain the cartons within each stack or stacks in precisely aligned or registered condition one with the other. The delay effected by timer IT assures that the carton stack or stacks, regardless of height, will be firmly clamped in the turret prior to the start of the inverting movement. Obviously, if preferred, the same result could be achieved by use of time delay module in the control portion of the circuitry. The purpose of contacts KR is to prevent operation of the turret-invert and return mechanism until the knives have fully retracted, since the motors for operating both mechanisms each require a substantial quantity of fluid and, if permitted to operate simultaneously, would require a larger quantity of fluid for the operating circuit than is the case when they are controlled to operate only in sequence.

The turret T, upon reaching its fully inverted position, opens contacts TI1 and closes contacts TI2. Opening of contacts TI1 removes the input from conductor 256 to terminal b of module TISA to result in deenergization of solenoids TIS, CLS and the timer IT which resets to complete its timing cycle and open its contacts ITC. The turret valve TV returns to its neutral condition maintaining the turret momentarily in the inverted position in which, as before described, the conveyor belts 128 are activated to discharge the stack or stacks of cartons from the turret T and onto any suitable receiving station S.

Closure of turret-invert contacts TI2 establishes an input from conductor 256 to the turret retract "Time Delay" module TRTD which is of the delay-on-make type and which after a preset delay period transmits an input to terminal a of the turret-retract "Sealed And" module TRSA. A coincident input also exists through turret-return contacts TR to terminal b of module TRSA so that after the delay period, module TRSA switches to produce an output at its terminal c which completes a control circuit through the associated turret-retract amplifier TRA thereby energizing the turret-retract solenoid TRS through the closed contacts ATI3 of the automatic turret-invert switch mechanism. The purpose of the delay provided by module TRTD is to enable sufficient time for the clamp member 124 to release its clamping pressure and the carton stacks to be conveyed out of the turret before the turret starts to return to its original position. The turret T, upon returning to its original position, operates to open its associated contacts TR to remove the input to terminal b of module TRSA which switches back and results in deenergization of the turret-return solenoid TRS. It will be noted that the operation of the turret mechanism in inverting the carton stack or stacks and then returning to its original position occurs while a new stack or stacks of cartons are accumulating on the elevator E which had, earlier in the cycle, been elevated to its fully raised position prior to retraction of the knife K, and which during this time is being progressively, step-by-step, lowered to receive the incoming cartons under control of the carton sensor mechanism 52. Assuming that the mechanism is still operating under control of the cyclomometer 5 to produce stacks of a preselected number of cartons each, the new stack or stacks now on the elevator E will continue to build up until the selected count is reached, whereupon the cyclomometer contacts CY will again close to initiate a second operating cycle of the mechanism similar to that just described.

An operating cycle of the mechanism may also be initiated under control of the stack height detector mechanism which comprises stack height detector contacts SD which, aforesaid, are arranged in parallel with the cyclomometer contacts CY. The contacts SD are operatively associated with the elevator mechanism in any suitable manner so that when the elevator reaches a predetermined position below its uppermost position, under control of the carton sensor means 52, the stack height detector contacts SD will close to fulfill the logic function of the knife "Sealed And" module KSA thereby initiating a cycle which in this instance will produce a carton stack or stacks of predetermined height, the height being the distance between the position of the elevator at the time contacts SD are closed and the operative plane of the knives K.

The mechanism may also be operated automatically under the joint control of the stack height detector means and the cyclomometer in such a manner that one mode of control will take over and initiate an operating cycle in the event of malfunction of the other mode of control. For example, if it were desired to produce stacks each having a predetermined number of cartons therein, the cyclomometer 5 would be set to close its contacts upon reaching the predetermined number. Depending upon the thickness of the cartons, the approximate height of a stack having said predetermined number would be readily calculable. After determination of the approximate height of such a stack, the stack height detector mechanism would be adjusted so as to initiate an operating cycle, i.e. by closing contacts SD, when the elevator is lowered a distance beneath the operative plane of said knives slightly in excess of the calculated height. With both modes of control operable under such circumstances, in the event of a malfunction in the cyclomometer means such as would fail to initiate an operating cycle, the mechanism, instead of jamming, would operate then under control of the stack height detector so as to produce stacks having approximately the same number of cartons as that preset into the cyclomometer. Conversely, if it were desired to produce a stack or stacks having a predetermined height, the stack height detector contacts would be adjusted for the corresponding stack height, and the number set in the cyclomometer 5 would be a number slightly in excess of the number of cartons calculated to comprise the desired stack height. Under such circumstances, in the event of failure in the stack height detector mechanism, such as would fail to initiate an operating cycle when the selected stack height had been reached, instead of jamming, the cyclomometer would take control and by closure of its contacts CY when the preset number had been reached would initiate an operating cycle to produce a carton stack or stacks having approximately the same height as those desired. The foregoing description of an operating cycle presumes that at the start of the cycle the conveyor mechanism from the cyclomometer 5 to the magazine 6 is completely supplied with its normal complement of cartons C which would not be the case, necessarily, for the beginning and end of a particular run of the punch press or other carton discharging mechanism with which the machine of the instant invention may be associated. At the beginning of a particular run, the conveyor mechanism would be devoid of cartons so that if the machine were running solely under control of the cyclomometer 5, the first carton stack or stacks to be formed on the elevator would be short of the desired number to the extent of the number of cartons in transit between the cyclomometer and the magazine. This shortage could easily be avoided merely by operating the mechanism and the associated punch press until the first carton stacks build up to a predetermined distance below normal in the magazine, said distance being equal to that between elevator E and knives K, and then stopped to enable setting the cyclomometer for the desired number. Upon resumption of the machine's operation, the first carton stack would have the desired number of cartons. If the mechanism were operating solely under stack height control, the same problem would not exist, because the number of cartons in transit between the magazine and the cyclomometer is not a factor. However, to operate under joint cyclomometer and stack height control, the procedure above described with reference to operation solely under cyclomometer control could be, preferably, followed.

The final cycle of a particular run might also result in stack shortage because the total number of cartons produced in a particular run might very well not be a multiple of the selected number of cartons in a stack of the selected height. For this and other reasons, means have been provided to clear the machine of the cartons remaining after completion of the last cycle of normal operation, said means being in the form of manually operable circuit closing means capable of selectively energizing any one of the load devices in the AC portion of the circuitry independently of the DC control portion of the circuitry.

Said manually operable circuit closing means includes a bank of individual, separately operable switches 265, each in a separate line 270–275 running to one side of each of the aforesaid load devices, the other side of which is connected directly to AC conductor 253. The lines 270–275 are joined by a common lead or bus 276 to a terminal of the Auto-Man. switch 260. When switch 260 is set in its "MAN." position, the bus 276 is connected directly with the other AC conductor 252, and the negative DC conductor 256 is disconnected. Accordingly, in the "MAN." setting of the switch 260, depression or operation of any one of the switches 265 will result in energization of the associated one of the load devices comprising solenoids KS, PS, EUS, EDS, CLS, TRS, and TIS after energization of the timer IT as heretofore described. Thus any one of said load devices may be selectively energized manually to operate the respective mechanism for any appropriate reason whether it be for clearing the machine, testing, adjusting or other purposes.

In some applications it may be desired to discharge stacks from the magazine without inverting them, and for this purpose switching means are provided for accomplishing this function. This switching means is labeled in FIG. 9 as the "Auto. Turret Invert" switch comprised of three pairs of ganged contacts ATI1–3. This switch is shown in its "ON" position in which contacts ATI1 are open and contacts ATI2–3 are closed. The foregoing description of an operating cycle explains the function of these switches in automatic turret inverting operation. When it is desired to discharge carton stacks without inverting them, said switch is set in its "OFF" position which closes contacts ATI1 and opens contacts ATI2–3. The closure of contacts ATI1 connects the turret-invert solenoid TIS directly across the AC conductors 252, 253, thus maintaining the solenoid energized and the turret consequently inverted continuously throughout the entire run of the mechanism and unaffected by the associated power switch or amplifier TIA. The opening of contacts ATI2 disconnects solenoid CLS and timer IT from the operating circuit. Opening of contacts ATI3 disconnects the turret-return solenoid TRS from the AC operating circuit. Thus when the "Auto. Turret Invert" switch is in the "OFF" position, the turret-invert solenoid TIS remains continuously energized and cannot be deenergized under influence of the control portion of the circuitry, while the clamp solenoid CLS, turret-return solenoid TRS and timer IT remain deenergized and cannot be energized under influence of the control portion of the circuitry.

It will be apparent that the concept herein disclosed of a progressive, lowering of the elevator under control of a carton sensor mechanism employing photoelectric means, together with the concept of dual or joint control over the stack size, either by number of cartons per stack or height of stack or both, provides a highly versatile flexible, and foolproof mechanism for achieving the desired results. The fact that the elevator in being progressively lowered moves in steps or increments of selected distance, as determined by the response time of the photocell unit 66 associated with the carton sensor 52 and the hydraulic system, does not mean that there is wide tolerance inherent in the stack height or carton number per stack control means, because extension of the knives K may occur at any time, even during a step movement of the elevator E, and is in no way limited to operation only when the elevator has completed a step of its progressive lowering movement prior to initiation of an operating cycle.

For uses of the equipment wherein the amount of tolerance in the stack height or carton number per stack control means is especially critical, increased precision or accuracy of these control means may be achieved by provision of means operating to slowdown or retard the progressive lowering movement of the elevator to thereby render its progressive movement more nearly continuous, rather than incremental, with each step of movement being at a rate more nearly equal to the rate of build-up of the stacks by the in-feeding cartons. One form of elevator-retard means could, for example, employ an elevator control valve EV (see FIG. 8) in the hydraulic circuit wherein at least section $a$ of the valve would be variably actuatable to variably adjust the size of the opening in the fluid coupling between pump U and the elevator-down side of the hydraulic motor 50 in accordance with the amount of voltage applied to the elevator-down solenoid EDS. In this form of elevator-retard means, the circuit (see FIG. 9A) could comprise switching means associated with the load circuit for solenoid EDS. The said switching means includes an elevator-retard switch ER1 which is magnetically operated and normally closed, said switch being in the line running directly between solenoid EDS and terminal c of the elevator-down amplifier EDA. A similar switch ER2, but normally open, is provided in a parallel or shunt line around switch ER1, said shunt line also including in series with switch ER2 an elevator-retard resistor ERR. Both of said switches are operated by an elevator-retard magnetic coil ERC in a line 280 connecting with the output line extended through diode D1 from output terminal d of "Sealed And" module KSA and running to the positive conductor 257 of the control portion of the circuitry.

As heretofore mentioned, the knife "Sealed And" module KSA switches its output from terminal c back to terminal d when the elevator reaches its upper limit and opens contacts EU. From this time on through the remainder of the cycle, the elevator lowers progressively under control of the sensor means 52, including photocell unit 66, which is responsive to the output from the aforesaid d terminal of module KSA. By joining the elevator-retard means by line 280 to the same output from module KSA, the elevator-retard means is rendered effective only during the progressive lowering movement of the elevator E and until the desired carton count or stack height has been reached. If desired, the resistor ERR could be a variable resistor or rheostat in order that the impedance provided thereby could be adjusted so that the overall velocity of the progressive lowering movement closely matches the rate of build-up of the cartons entering the magazine.

Figure 9B:
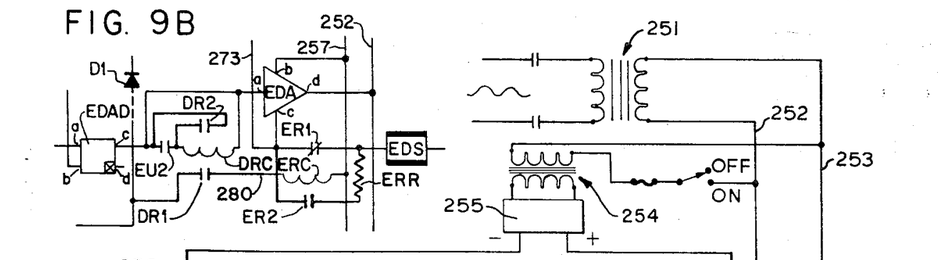

Since there is normally an excess of cartons resting on the knives at the time the elevator returns to its uppermost position due to the accumulation thereof during the previous portion of the operating cycle, means could, if desired, be provided to temporarily or initially disable the elevator-retard means so as to more quickly bring the top of each stack to its normal relationship with the carton sensor means 52, thereby enabling the elevator-retard means to be adjusted for more closely matching the rate of stack build-up by the in-feeding cartons. Such disabling means could take the form of an additional pair of elevator-up contacts EU1 in line 280, which are normally closed and open when the elevator returns to its uppermost position. This would have the effect of disabling the elevator-retard means until the elevator lowers sufficiently to permit such contacts to close. Furthermore, since the amount of excess accumulation of cartons is calculable, depending on carton thickness and in-feed velocity, said additional contacts could, if desired, be adjustably mounted in a position such as to be closed after the elevator has descended a predetermined distance from its uppermost position. In order to avoid the necessity for adjustably mounting such additional contacts, said contacts EU2 (FIG. 9B) could be physically located such as contacts EU, but normally open so as to close when the elevator is at its uppermost position, and arranged in a branch circuit connected in the output line from terminal c of the elevator-down "And" module EDAD, which branch circuit would include a magnetic delay-retard coil DRC for operating normally closed delay-retard magnetic contacts DR1 in line 280 and also delay-retard holding contacts DR2 for maintaining the coil DRC in the branch circuit energized after contacts EU2 open and as long as the output from said terminal c of module EDAD continues. Once the said output is interrupted, the holding circuit would be broken and the coil DRC could not again be energized until the elevator returns to its uppermost position. This would have the effect of disabling the elevator-retard means during the initial portion of the progressive lowering movement until the top of the stacks reach normal position relative to the carton sensor means, whereupon the elevator-retard means would become effective for the remainder of the progressive lowering of the elevator and until the desired number of cartons per stack or stack height is reached to initiate another operating cycle which, as aforementioned, starts with the extension of the knives K.

It should also be noted that accuracy in the means for controlling the stack height or number of cartons per stack is promoted by mounting the knives K in a position such that when extended they penetrate the carton stacks in a direction running from the trailing edge to the leading edge of the cartons rather than vice versa. In so doing, it is more likely that the knives will penetrate the stacks at the precise location called for by the respective control means by virtue of the fact that the cartons, when entering the magazine from conveyor C, drop onto the pile leading edge first. This tends to render the leading edge of the cartons in the respective stacks more closely compacted than their trailing edges, thus providing greater tolerance for penetration of the pile by the knives at the intended position.

While there has been shown and described herein what is considered to be a preferred embodiment of the invention, it will, of course, be understood that changes in form and detail could be made without departing from the spirit of the invention. It is therefore intended that the invention be not limited to the exact form and details herein shown and described, nor to anything less than the whole of the invention herein disclosed as hereinafter claimed.

What is claimed is:

1. An inverting turret comprising, laterally spaced side frames supported for rotary movement about a horizontal axis extending transverse to the direction of movement of an infed article, a radially movable clamping plate carried by said turret at one side of said rotational axis, and a radially unmovable clamping and conveying unit carried by said turret at the opposed side of its rotational axis and at the same radius as said plate, means responsive to delivery of an article onto said plate for effecting relative closing movement between said clamping plate and said unit to clamp said article therebetween, means responsive to the delivery of said article onto said plate for turning said turret through a predetermined path of travel, means for causing relative separating movement between said clamping plate and said unit to release said article from clamping pressure, means for driving said conveying unit to travel said article out of said turret, said unit comprising endless belt means, said clamping plate being mounted for movement to and from clamping relationship with said belt means, said driving means being operative only when said turret has turned through its predetermined path of travel for rotating said endless belt means, the means for operating said turret and said clamping plate comprising hydraulic motors, fluid control means for controlling the operation of said motors, and electrically responsive means for actuating said control means, slide bearings mounted on the sides of said clamping plate, slide shafts mounting said bearings for movement of said plate to and from said unit, racks carried said slide bearings, a stabilizing shaft having its ends journalled in said side frames of said turret, and pinions fixedly mounted on said shaft and meshing with said racks to equalize the load on said motors when moving said plate to and from said unit.

* * * * *